Jan. 24, 1933.  I. HECHENBLEIKNER ET AL  1,894,992
CONVERTER
Filed Feb. 6, 1930
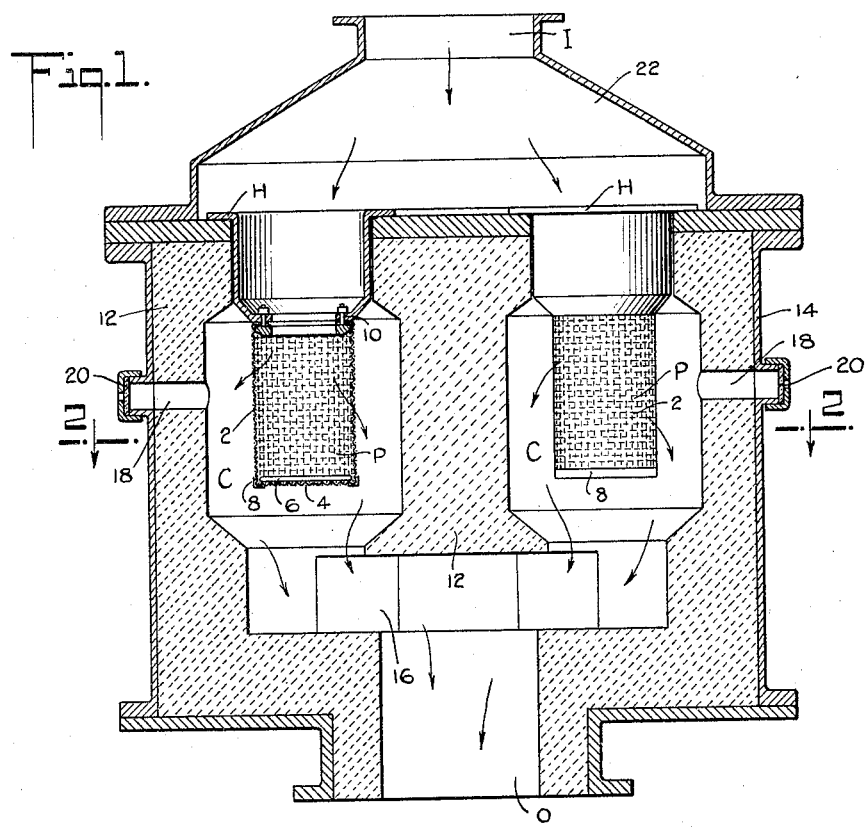
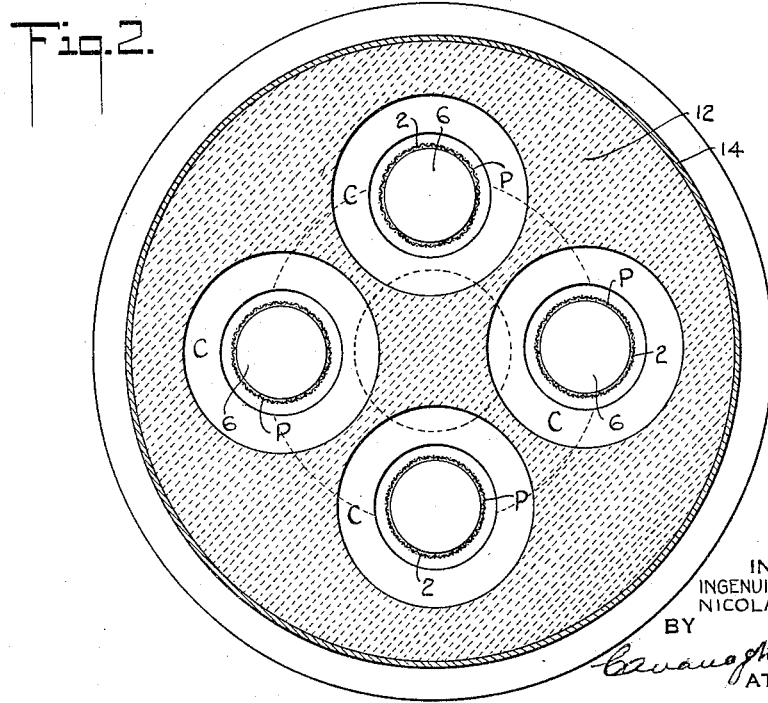
INVENTORS
INGENUIN HECHENBLEIKNER
NICOLAY TITLESTAD
BY
ATTORNEYS Patented Jan. 24, 1933

1,894,992

UNITED STATES PATENT OFFICE

INGENUIN HECHENBLEIKNER AND NICOLAY TITLESTAD, OF CHARLOTTE, NORTH CAROLINA, ASSIGNORS, BY MESNE ASSIGNMENTS, TO CHEMICAL CONSTRUCTION CORPORATION, OF CHARLOTTE, NORTH CAROLINA, A CORPORATION OF DELAWARE

CONVERTER

Application filed February 6, 1930. Serial No. 426,269.

This invention relates to converters, and more particularly to converters employing a gauze catalyst.

The general object of the present invention is to increase the operating life, to increase the conversion efficiency, and to decrease the catalyst cost for a given quantity of conversion product, when using a gauze catalyst.

Our invention is particularly applicable to and therefore will be described in connection with the manufacture of nitric acid. In this process ammonia is distilled from ammonia liquor by a current of air, and the ammonia and air mixture is passed through a converter utilizing platinum gauze as a catalyst in order to oxidize the ammonia. One primary object of the present invention is to obtain maximum operating efficiency in the entire manufacturing plant. This we have found may in general be obtained by utilizing appropriately large units in the plant.

The platinum gauze in the converter is ordinarily in the form of a cylindrical basket through which the reaction gas is forced. Upon increasing the size of the various units used throughout the plant it heretofore was the practice to also commensurately increase the size of the converter and of the platinum gauze basket used therein. This has resulted in an increased catalyst cost principally due to the fact that greater difficulty is experienced with the gauze, it blowing through or bursting in considerably less time than is the case with smaller baskets. This difficulty has militated against the otherwise desirable use of large units throughout the plant, and, accordingly, one important object of our invention is to overcome this difficulty and to reduce the catalyst cost per ton of acid, while retaining the optimum size of units for the various steps in the manufacturing process. To this end we employ a multiple converter consisting essentially of a plurality of relatively small gauze catalyst converters of the basket type, and means to feed reaction gas thereto in parallel.

Another object of the present invention is to obtain a high conversion efficiency as well as a low catalyst cost. It is obvious that the conversion efficiency may be greatly reduced if the reaction gas is fed to a relatively exhausted catalyst, and, in accordance with a further feature of our invention, the reaction gas is suitably apportioned amongst the gauze baskets for best conversion efficiency, the flow of gas to an exhausted basket being reduced relative to that through a basket which is still in active condition.

To the accomplishment of the foregoing and such other objects as will hereinafter appear, our invention consists in the elements and their relation one to the other, as hereinafter more particularly described and sought to be defined in the claims; reference being had to the accompanying drawing which shows the preferred embodiments of our invention, and in which:

Fig. 1 is a section taken in elevation through a multiple converter embodying our invention; and Fig. 2 is a horizontal section taken in the plane of the line 2—2 in Fig. 1.

In the manufacture of nitric acid by the ammonia oxidation process, ammonia liquor is fed to a stripping column or tower through which a current of air is blown, and the resulting mixture of air and volatilized or distilled ammonia is led to a converter where the ammonia is oxidized. The converter employs platinum gauze as a catalyst and this gauze is usually in the form of a cylindrical basket. The oxidized gas or reaction product from the converter may be absorbed in suitable absorption tanks or drums to obtain the desired nitric acid. A compressor may be used in the flow circuit in order to decrease the pressure in the stripping tower to aid the volatilization of the ammonia and to increase the pressure in the absorption drums to aid in the solution of the acid and anhydride. Suitable heat exchanges may be used in various combinations in the system in order to take advantage of the thermal nature of the reactions at different stages in the process.

We have found it to be desirable, particularly in large plants, to install few large units rather than many small units. By so doing greater overall efficiency may be realized in the plant, and the necessary supervision is reduced because the control of flow ratios, gas strength, and heat exchange for desired reaction temperatures is greatly simplified and facilitated.

In increasing the size of the units used, such as the stripping tower, the ammonia liquor tanks, the air blower, the absorption drums and heat exchangers, it has heretofore also been the practice to commensurately increase the size of the converter used in order to obtain the necessary area of platinum gauze catalyst. The platinum becomes increasingly brittle with use, and after a time the strength of the platinum wire in the gauze seems to become exhausted and the gauze bursts under the pressure differential to which it is exerted by the reaction gas flowing therethrough. It is found that the bursting point is reached much sooner with a large converter than with a small converter. For example, in converting a certain amount of ammonia per square inch of contact surface, a platinum gauze of say four inches diameter will last twelve months or more; one of six inches diameter will last say eight to ten months; one of eight inches diameter will last say six to eight months; while a gauze which is fourteen inches in diameter will last only from three to five months.

It should be understood that the bursting of the gauze is premature and is not due to exhaustion of the catalytic life of the platinum. For example, the wire from the burst gauze may be reweaved and reworked, but this procedure is expensive and, consequently, the use of a large converter greatly increases the catalyst cost per ton of acid manufactured.

In accordance with our invention we employ, instead of a simple large converter, a multiple converter. We utilize appropriately large units in the plant for efficiently practicing the successive steps in the process other than the conversion step, and we subdivide the necessary gauze area for the conversion step into a plurality of relatively small converters to which we feed the reaction gas in parallel. In its apparatus aspect our invention resides in the provision of a novel multiple converter, a preferred form of which may best be understood by reference to the accompanying drawing.

In the multiple converter shown the conversion chamber is subdivided into a plurality of relatively small conversion chambers C, in each of which a platinum gauze basket P is suspended, preferably from a nickel holder H at the top of the conversion chambers C. A common gas inlet I is used to supply reaction gas to the platinum baskets P, while a common gas outlet O discharges the reaction product from the several conversion chambers.

Considering the converter in greater detail, each platinum gauze P is preferably in the form of a basket having a cylindrical surface 2 and a bottom surface 4. The bottom gauze is covered with a silica disk 6 in order to prevent impurity-containing dust in the reaction gas from settling on and eating through the bottom gauze 4. The cylindrical gauze surface 2 is preferably composed of a plurality, say four layers, of platinum mesh gauze, and these layers may, if desired, be varied in mesh and weight of wire in accordance with the disclosure in a copending application of Nicolay Titlestad and Samuel F. Spangler, Serial No. 420,409, filed January 13, 1930. The bottom edge of the basket may be reinforced with platinum foil, as is indicated at 8, in order to prevent the basket from breaking through at the corner thereof, while the top of the basket may be held by the clamping means 10 of the annular and preferably nickel holders H, in accordance with our copending application Serial No. 431,176, filed February 25, 1930.

It will thus be seen that each of the small converters in our multiple converter is similar to the large converters heretofore used. A similar converter lining, indicated at 12, may be employed, but this is so disposed within the multiple converter shell 14 as to form a plurality of small chambers C, as is best indicated in Fig. 2. These small chambers all lead into a common large chamber 16 near the bottom of the converter, and this is in direct communication with the outlet O.

The converter lining 12 and shell 14 should be provided with sight or peep holes 18, the outer extremities of which are provided with a heat resistant glass 20, such as pyrex, in order to permit of inspection of the condition of the catalyst baskets.

Reaction gas is fed through the inlet I and is distributed to the various holders H by means of a common hood 22 made of a suitable metal, say aluminum. The reaction gas at this time is cool and no lining is needed. The entire converter chamber beyond the catalyst and including the outlet O should be suitably lined with a refractory lining because of the high temperature of the reaction product after conversion.

A single gas-tight shell or housing is used, and outside connection need be made to only a single inlet and a single outlet, all as conveniently as if a single large converter were being used. But the inside is subdivided into plural compartments, best formed simply by a solid filling of lining material. Each compartment is preferably generally cylindrical, as shown, and has its gauze basket mounted concentricaly therein, as shown, so that the effective gauze surface is everywhere equidistant from the nearest lining surface. The arrangement reduces space requirement and gas leaks, and conserves heat.

By the expedients already briefly mentioned in describing the catalyst baskets, the life thereof has been lengthened until the limiting factor is bursting or blowing through of the cylindrical portion 2 thereof. The greatly reduced life of the large baskets we believe to be due to the increased tension under which the gauze is placed when the diameter of the basket is increased, inasmuch as the area upon which the pressure differential of the gas flowing through the gauze is exerted is correspondingly increased. We therefore propose to limit the diameter of the gauze baskets, thereby limiting the stress applied thereto and permitting the useful life of the basket to more nearly approach the chemically or catalytically active life of the platinum. Of course, the area of catalyst must be maintained in order to retain the desired conversion efficiency. It is not desirable to simply reduce the diameter and increase the length of the basket because the conversion efficiency seems to be dependent upon the ratio of the basket diameter and length. In accordance with our invention the multiple converter already described is employed and the total area of the gauze baskets is made equal to that desired, the proportioning of the individual baskets may be selected as desired, and the size of the individual baskets, and particularly the diameter thereof, may be limited to any desired value. It goes without saying that while the multiple converter illustrated employs four baskets, this quantity may be varied as desired to suit the requirements of any particular case. It will also be appreciated that while we think it preferable to have the converter chambers separated with insulating material as shown, this is not at all essential to the practice of the invention, for separate baskets may be used all mounted in a single large converter chamber.

The multiple converter reduces the catalyst cost per ton of acid manufactured by lengthening the useful life of the gauze catalyst. It is additionally necessary to obtain a high conversion efficiency, and some of the factors affecting this have already been mentioned. One additional factor remains to be considered, which is caused by the fact that the baskets may deteriorate or wear at different rates. For example, suppose one of the baskets is nearly exhausted while the others continue to be active. If reaction gas is fed to all of the baskets equally the overall conversion efficiency will immediately be reduced because of the effect of the nearly exhausted gauze. To maintain the conversion efficiency it is necessary to appropriately vary or apportion the feed of reaction gas to the several gauzes, the feed to a more nearly exhausted gauze or basket being reduced relative to that to the more active gauzes or baskets.

This apportionment may be obtained by having separate pipes or inlets leading to the various gauzes and all extending from a common manifold or header, with independent valves or dampers in each of the pipes or inlets to apportion the flow of reaction gas. However, we have found that in the ordinary case this precaution is superfluous, and a simple valveless arrangement such as we have illustrated may be employed to good advantage because there is an automatic apportionment or distribution of the reaction gas. More specifically, we have found that when the life of platinum gauze approaches exhaustion the pressure drop therethrough increases. This has the effect of retarding the gas flow through such a gauze, and of correspondingly increasing the proportion of flow through the gauzes which are in better or more active condition. The overall effect of this phenomenon is that in the multiple converter the load through the various gauzes is automatically equalized and appropriately varied if some of the baskets should approach exhaustion sooner than others. In this manner the conversion efficiency of the multiple converter is kept at a high value.

The preferred mode of successfully practicing our invention and of constructing the apparatus for the same, as well as the many advantages thereof, are believed to be apparent from the foregoing description. The efficiency of a plant which practices a process including catalytic conversion of reaction gas by means of a gauze catalyst, is kept high by utilizing appropriately large units for efficiently practicing the successive steps in the process other than the conversion step. Meanwhile, the catalyst cost is kept low by subdividing the necessary gauze area into a plurality of relatively small converters. The conversion efficiency of the multiple converter is kept high by adopting for each of the small converters the precautions ordinarily taken with a single large converter, and further by the preferably automatic apportionment or distribution of the load on the individual small converters making up the multiple converter.

It will be appreciated that our invention is applicable to processes other than the manufacture of nitric acid and ammonia oxidation, and to catalysts other than platinum and the platinum alloys, so long as the catalyst is in the form of a mesh or gauze or any like screen through which reaction fluid is passed.

It will be apparent that while we have shown and described our invention in the preferred forms, many changes and modifications may be made in the method and structures disclosed without departing from the spirit of the invention, defined in the following claims.

We claim:

1. A catalytic converter comprising a relatively large converter shell or housing, a plurality of gauze baskets supported in said converter housing and arranged to collectively receive the full gas flow and to operate thereon in parallel, the length and the diameter of each of said gauze baskets being made in optimum ratio for best gas flow distribution and maximum conversion efficiency, a common gas inlet to the converter housing, and a common gas outlet for discharging the reaction products from the conversion chambers.

2. A converter for the catalytic oxidation of ammonia, comprising a relatively large converter shell or housing subdivided by a filling of lining material into a plurality of conversion chambers, a platinum gauze basket supported in each of the said conversion chambers, a common gas inlet to the converter housing, and a common gas outlet for discharging the reaction products from the conversion chambers.

3. A converter for the catalytic oxidation of ammonia, comprising a relatively large converter shell or housing subdivided by a filling of lining material into a plurality of conversion chambers, a platinum gauze basket supported in each of the said conversion chambers, the length and the diameter of each of said gauze baskets being made in optimum ratio for best gas flow distribution and maximum conversion efficiency, a common gas inlet to the converter shell or housing, and a common gas outlet for discharging the reaction products from the conversion chambers.

4. A converter for the catalytic oxidation of ammonia, comprising a relatively large converter shell or housing subdivided by a filling of lining material into a plurality of generally cylindrical conversion chambers, a platinum gauze basket concentrically supported in each of the said conversion chambers so that the effective gauze area is equidistant from the lining walls, the length and the diameter of each of said gauze baskets being made in optimum ratio for best gas flow distribution and maximum conversion efficiency, a common gas inlet to the converter shell or housing, and a common gas outlet for discharging the reaction products from the conversion chambers.

Signed at Charlotte in the county of Mecklenburg and State of North Carolina this 3 day of Feb. A. D. 1930.

INGENUIN HECHENBLEIKNER.
NICOLAY TITLESTAD.